April 8, 1924. 1,489,589
C. E. BONINE
VEHICLE TIRE AND RIM
Filed April 2, 1920 2 Sheets-Sheet 2
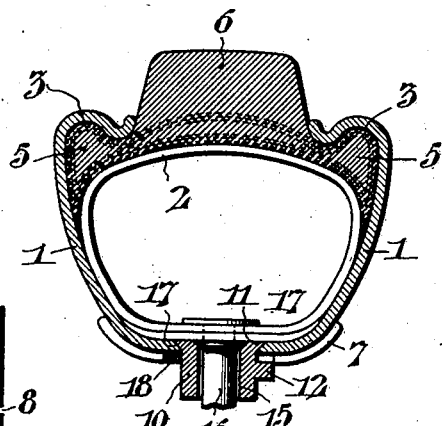
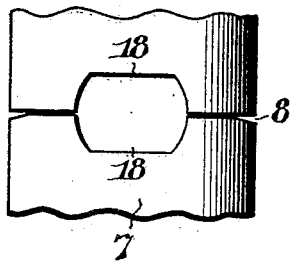
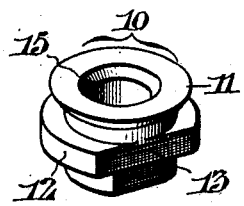
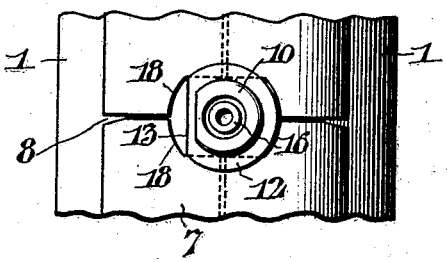
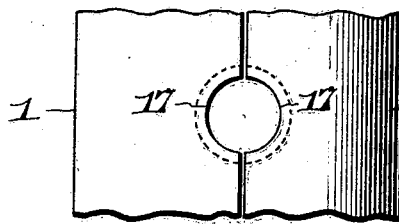
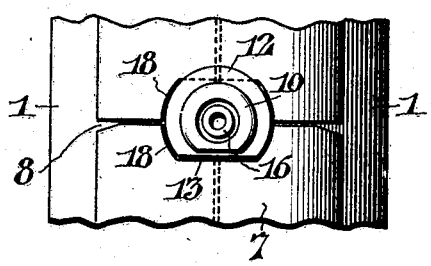
WITNESSES:
John E. Bergner
James H. Bell
INVENTOR:
Charles E. Bonine,
BY
ATTORNEYS.

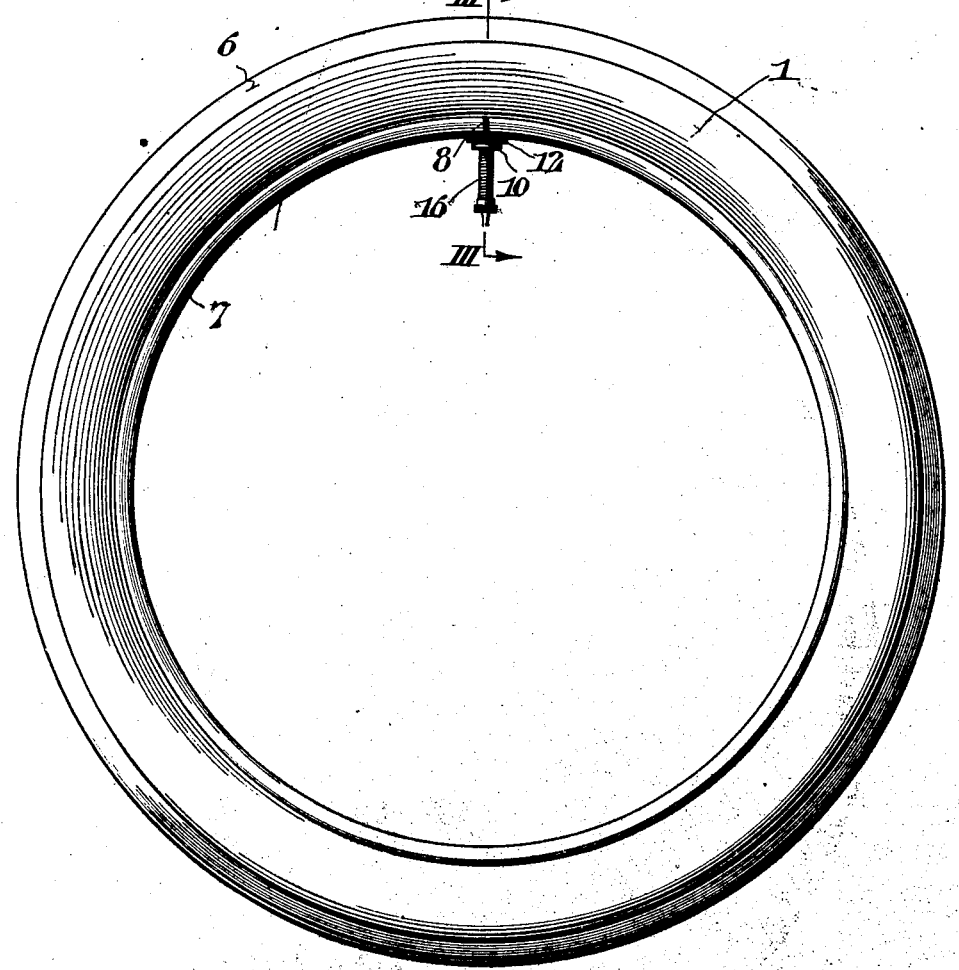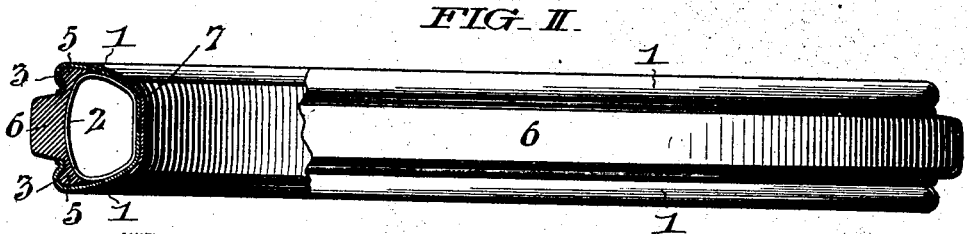

Patented Apr. 8, 1924.

1,489,589

UNITED STATES PATENT OFFICE.

CHARLES E. BONINE, OF CHELTENHAM TOWNSHIP, MONTGOMERY COUNTY, PENNSYLVANIA.

VEHICLE TIRE AND RIM.

Application filed April 2, 1920. Serial No. 370,659.

*To all whom it may concern:*

Be it known that I, CHARLES E. BONINE, a citizen of the United States, residing in Melrose Park, in the township of Cheltenham, in the county of Montgomery and State of Pennsylvania, have invented certain new and useful Improvements in Vehicle Tires and Rims, whereof the following is a specification, reference being had to the accompanying drawings.

The invention relates to vehicle tires and rims, and is directed primarily to a structure having all the advantages of the ordinary pneumatic type as to riding qualities, etc., but in which the inner tube is so well protected as to be substantially proof against puncture. This end I obtain by providing a metallic protective casing, wherein the inner tube is appropriately housed, the shocks of road travel being transmitted through the medium of a resilient tread member projecting through a circumferential opening in the casing, and provided with suitable clincher beads by which its retention in the structure is effected.

The invention also comprehends a protective casing structure, of the above character, which is so arranged as to be readily dis-assembled, and in which the constituent elements are normally held from relative displacement by a single locking means of novel design.

The invention also comprehends certain other novel features of construction and arrangement which will become apparent from the detailed description which follows.

In the accompanying drawings, Fig. I, is a side elevation of a structure of demountable rim type conveniently embodying my invention.

Fig. II, is an edge view of the same, a portion being cut away to show the general cross sectional configuration of the structure.

Fig. III, is a cross section on an enlarged scale viewed in the direction of the arrows III—III in Fig. I, showing the means by which the constituent elements of the structure are secured in locked relation.

Fig. IV, is a fragmentary illustration showing the appearance of the inner periphery of the rim structure at the region of the locking device.

Figs. V and VI, are fragmentary views of certain elements of the structure showing the configuration of the openings formed therein for the reception of the locking device.

Fig. VII, is a view similar to Fig. IV, illustrating the position to which the locking device is turned when collapsing the structure.

Fig. VIII, is a detail perspective view of the locking device alone.

The structure typical of my invention, comprises two metallic rim and casing members 1, 1, which are exact counterparts of one another and when assembled with their inner peripheries abutting, constitute a casing having the general cross sectional configuration best shown in Fig. II, adapted to hold and protect a resilient tire including a pneumatic tube designated by the numeral 2. The outer peripheries or edges of said side wall members are appropriately curved to provide internal peripheral grooves 3, 3, adapted to receive and retain correspondingly shaped peripheral beads 5, 5, formed upon the tread member 6, and are thus interlocked with said tread 6. This tread member 6 is preferably of rubber and reinforced by fabric in a manner conventionally represented in Fig. III, according to the usual practice followed in pneumatic tire construction. The expansion of the inner tube 2, normally maintains the beads of the superjacent tread 6 seated within the retaining grooves 3.

Referring once more to Fig. II, it will be noted that the inner circumferential edges of the members 1, 1, abut in the median plane of the assembled structure, and that the line of abutment is overlapped by a ring 7, having such cross sectional configuration as to extend outwardly and partially embrace said rim and casing members 1, 1, so as to keep these parts together in opposition to the expansion of the pneumatic tube 2. The ring 7, is split as shown at 8, in Figs I, IV, VI and VII, and the several elements of the structure are kept from relative displacement by means of a locking device 10, shown to best advantage in Fig. VIII. This locking device is substantially cylindrical in form, and is provided with spaced integral peripheral ridges, one a head 11, and the other a flange 12, the latter of the two being cut away as shown at 13, for a purpose which will be explained hereinafter. Said device is also bored axially as at 15, to receive the valve stem 16, of the inner tube 2, about which it is centered and is turnable. In order to accommodate the locking device, the several elements of the structure are provided with suitable openings which are brought into registry preparatory to assembling.

Referring first to Fig. V, it will be seen that the members 1 and 2 are formed with beveled semicircular notches 17, 17, which together constitute a countersunk seat for the head 11, of the locking device, which is shaped accordingly. The meeting ends of the ring 7, are notched as at 18, 18, to form in conjunction, an opening approximating an elliptical form as shown in Fig. VI.

In assembling, one of the members 1, is first laid flat upon a suitable supporting surface, and the tread member 6, inserted so that its peripheral bead 5, upon the one side is properly engaged within its retaining groove 3, in said member 1. The locking device 10, is then placed so that its head 11, engages properly with the seat provided for it in the notch 17, of the member 1. Thereupon the valve stem 16, of the inner tube is slipped through the axial opening 15, in the locking device, and the tube carefully laid in place. The other member 1, is then superimposed upon the whole, care being taken that the head 11, of the locking device is fully engaged within its seat without danger of puncturing the tube. At this point of the assembling, it is essential that the flattened or cut away side of the locking device should occupy a lateral position with respect to the meeting line of the members 1, 1. When the locking device 10 is in this angular position one notched end of the unitarily springy split ring 7, may be engaged beneath the peripheral ridge 12, and after the ring has been otherwise properly placed, its other end may be finally pressed home, this being made possible by the interruption in the ridge 12, of the locking device. The last described step in assembling will be more readily understood by reference to Fig. VII, of the drawings. A subsequent quarter turn of the locking device 10, by means of a wrench or other suitable implement, will serve to cause the flange 12, to overlap the ends of the split ring, as clearly shown in Fig. IV, and with the locking device 10 in this angular position the several constituent elements of the structure will be securely locked together against relative displacement.

It will be seen that the sheet metal rim and casing members 1, 1 form a rounded and outward-flaring, laterally-resilient seat for the pneumatic tube 2 and the tread 6, and that while the ring member 7 embraces the members 1, 1, adjacent their bases sufficiently to keep them together, it permits their outer portions to yield resiliently by virtue of the natural springiness or elasticity of the metal. The outer edges of the rim members 1, 1 are interlocked with the tread 6, as already described, and thereby in a manner tied together. This combined resilient action of the pneumatic tube and the rim members 1, 1, in aid of one another is made possible, of course, by the outward flare of said members 1, 1 and their freedom beyond the portions embraced by the securing ring 7.

Having thus described my invention, I claim:

1. A demountable rim for vehicle wheels, comprising a pair of annular rim members each having a narrow bottom wall and a relatively wide outwardly flaring side wall terminating in an inturned bead receiving edge, the bottom walls abutting edgewise to dispose the side walls in diverging relation to receive a tread member inserted between the rim members, an annular split band having outwardly turned edges to engage around the side walls and retain the rim members against separation, and means for locking the ends of said band in alignment.

2. In a device of the character described, a rim and tube including the tire valve, a split retaining band having its ends formed with opposing recesses, a locking element extending through the recesses and having a rotatable anchorage in the rim retaining the band ends in alignment, and a mutilated flange formed with the locking member adapted to lap the edges of both recesses simultaneously to retain the band in place, or to unlap either recess edge to permit the unlapped end of the band to be disengaged from the rim while holding the other end, the locking member being bored to permit passage of the tire valve therethrough.

In testimony whereof, I have hereunto signed my name at Philadelphia, Pennsylvania, this 30th day of March, 1920.

CHARLES E. BONINE.

Witnesses:
JAMES H. BELL,
E. L. FULLERTON.